United States Patent [19]
Deibel et al.

[11] 3,745,853
[45] July 17, 1973

[54] ADJUSTABLE CONNECTING ARM

[75] Inventors: Raymond A. Deibel, West Falls; William C. Reister, Williamsville, both of N.Y.

[73] Assignee: Trico Products Corporation, Buffalo, N.Y.

[22] Filed: Mar. 22, 1972

[21] Appl. No.: 236,850

[52] U.S. Cl. .................. 74/586, 15/250.13, 287/65
[51] Int. Cl. ............................................ F16c 7/06
[58] Field of Search .................. 74/586; 15/250.13, 15/250.16, 250.19, 250.27, 250.31; 287/64, 65, 85 R

[56] References Cited
UNITED STATES PATENTS
2,528,678  11/1950  Anderson .................... 287/65 R
2,608,707  9/1952  Oishei ........................ 15/250.13

*Primary Examiner*—Charles J. Myhre
*Assistant Examiner*—F. D. Shoemaker
*Attorney*—E. Herbert Liss

[57] ABSTRACT

A connecting arm for transmitting motion from a windshield wiper motor to a windshield wiper arm is adjustable, lengthwise to permit accurate positioning of the windshield wiper arm in the parked position. The connecting arm includes a toothed surface meshing with an opposed toothed surface on an adjustable connecting arm end extension. The connecting arm end extension is secured to the end of the connecting arm with the opposing toothed surfaces in engagement. A releasable latching mechanism provides a compressive force between the connecting arm and connecting arm end extension to maintain the opposing toothed surfaces in meshing engagement when the arm extension is disposed in a suitable position. When the latching mechanism is released the connecting arm and the connecting arm end extension may be moved longitudinally relative to each other. The latching mechanism includes a bifurcated clip for securing a stud in a journal bearing at the end of the arm extension. A single latching operation retains the connecting arm in position in the linkage transmission and locks the adjustable end extension in proper position.

7 Claims, 6 Drawing Figures

3,745,853

ADJUSTABLE CONNECTING ARM

BACKGROUND OF THE INVENTION

The present invention relates to an adjustable connecting arm for a windshield wiper transmission linkage assembly. In wind-shield wiper transmissions a connecting arm extends between a crank arm fixed to the motor piston shaft and a slave arm or other linkage element in the assembly. Current practice is to install the linkage transmission assembly and then to mount the wiper arms so that they lie as close as possible to the desired park position. Wiper arms on passenger vehicles include an internally knurled recess in a mounting head which fits on an externally knurled cylindrical drive burr. The angular displacement between teeth on the mounting head and drive burr is such as to permit accurate adjustment to within about four degrees. Thus, the parked position of the wiper arm may vary from the desired parking position by as much as four degrees. Variations in positioning may also result from manufacturing tolerances in the transmission system. The displacement from the desired park position can be corrected by employing an adjustable length connecting arm and by varying its length during installation.

SUMMARY OF THE INVENTION

The unique and novel construction of the adjustable connecting arm assembly of this invention facilitates and expedites installation and accurate positioning of the wiper arms. In a single operation the connecting arm may be positively retained at its proper adjusted length and secured to the adjacent linkage element. A longitudinally adjustable connecting arm end extension is releasably latched in position on the connecting arm. When released the connecting arm end extension is longitudinally movable relative to the connecting arm. The wiper arm may be mounted on the drive burr of the pivot shaft at the nearest possible position to the desired parking position because with the latch released the connecting arm assembly is adjustable in length by application of a longitudinal force. The connecting arm assembly will thus assume the length necessary to maintain the wiper in the desired park position. A rotatable latching lever is then moved to latching position to fix the connecting arm end extension against longitudinal movement relative to the connecting arm. Concurrently the latching lever secures a stud on an adjacent linkage element in the journal bearing at the end of the connecting arm assembly for pivotal movement. This dual purpose latch lever assembly serves to release the connecting arm end extension to permit adjustment of the arm length during installation. When the latch lever is rotated to closed position, the connecting arm end extension is secured in fixed position relative to the connecting arm. A bifurcated spring lock engages a circumferential groove at the exposed end of a stud mounted on an adjacent linkage element which is journalled in the bearing assembly at the end of the connecting arm end extension. With a single motion the wiper system can be latched in the desired operative position. This greatly facilitates wiper system installation.

The principal object of the present invention is to provide a simple, economical, adjustable connecting arm assembly for a windshield wiper linkage transmission which facilitates installation of the system and proper positioning of the wiper arm.

Another object of the invention is to provide a connecting arm for windshield wiper transmission linkage which is adjustable in length during installation and which can be securely latched in the desired operative position and concurrently secured for pivotal movement to an adjacent element in the transmission.

Other objects and advantages of the invention will be apparent from the following detailed description taken in connection with the accompanying drawings.

DETAILED DESCRIPTION OF THE INVENTION

Figure 1:
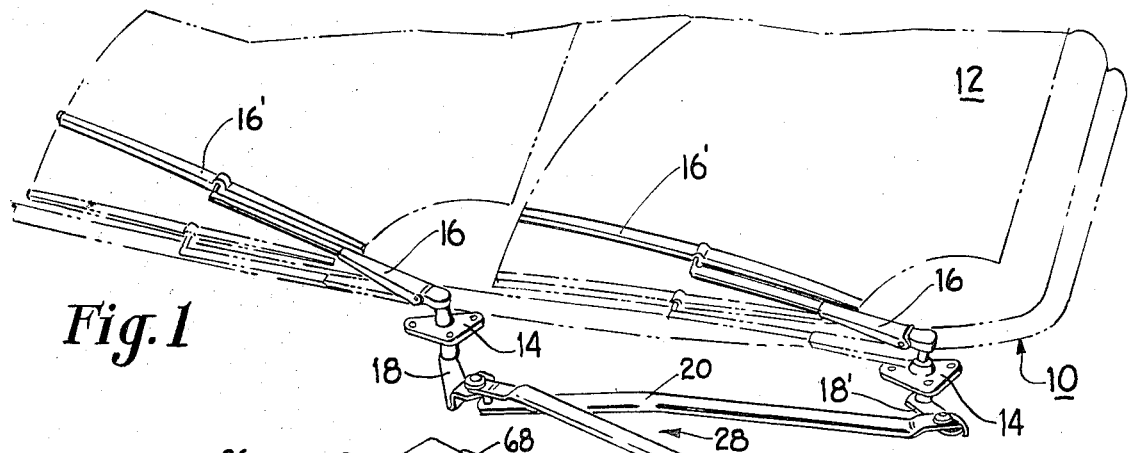
FIG. 1 is a fragmentary perspective view of a motor vehicle incorporating the invention.

Referring to the drawings FIG. 1 shows a fragment of a motor vehicle 10 having a windshield 12. Pivot shaft bearing housings 14 are suitably positioned at the cowl of the vehicle, and have pivot shafts (not shown) journaled therein. At the outer end of the pivot shafts there are mounted wiper arms 16 for rotation therewith. At the inner end of pivot shafts beneath the cowl, crank arms 18, 18' are secured. Slave arm 20 is connected at each end to one of the crank arms 18, 18'. A wiper motor and gear box assembly 22 having a crank arm 24 secured to the output shaft is suitably mounted within the engine compartment adjacent to the fire wall. A connecting arm assembly 26 extends between the free end of the crank arm 24 and the free end of the crank arm 18 at one of the pivot shafts. The connecting arm assembly 26 is pivotally secured to the crank arms 18 and 24. The crank arms 18 and 24, slave link 20, and the connecting arm 26 constitute a linkage transmission assembly 28 for transmitting motion from the motor assembly 22 to the wiper arm 16 and for converting the rotary output of the motor assembly 22 to oscillation of the wiper arms.

It can be seen from the FIG. 1 that when the position of the crank arm 24 is fixed the position of the wiper arms 16 can be changed by altering the length of the connecting arm assembly 26 but that when the length of the connecting arm assembly 26 is fixed and the position of the crank arm 24 is fixed there can be no movement of the wiper arms 16. During installation it is often necessary to make minor adjustments in the position of the wiper arms to achieve a proper parking position against the lower molding of the windshield so that the driver's view is not obstructed when the wiper is parked. For this purpose the connecting arm assembly 26 of this invention is made adjustable for purposes of installation.

The connecting arm assembly 26 comprises main connecting arm 30, connecting arm end extension 32 and a latch lever assembly 34. The connecting arm 30 is slotted adjacent its end with the major axis of the slot 37 coincident with the longitudinal axis of the arm. It is serrated at the end preferably with coined teeth 36 on one surface. The connecting arm end extension 32 includes a bearing assembly 38 adjacent an end thereof which may be of any suitable type capable of accomodating canting of the arm, as for example, a compression mounted bearing as shown in U. S. Pat. No. 3,316,033 issued Apr. 25, 1967 by Peter C. Bila and assigned to the assignee of the present invention. The arm end extension 32 is also toothed on a surface as at 40 so as to mesh with the coined teeth 36 on the connecting arm 30. An opening 42 in the arm end extension 32 is disposed in alignment with slot 37 of connecting arm 30. A headed stud 44 is received through opening 42 and slot 37. A contoured flat spring 46 having an opening 48 overlies the connecting arm 30 with the opening 48 in alignment with the slot 37. A clamping or latching lever 50 overlies the flat spring 46 and has a polygonal opening 52 in alignment with opening 48, slot 37 and opening 42. The stud 44 comprises a head 54 and a cylindrical shaft 58 corresponding in size to the opening 42. The shaft 58 at its free end 60 is formed to correspond in size and shape to the polygonal shaped opening 52 in latch lever 50. The shaft or post 58 of stud 44 extends through aligned openings 42, slot 37, and opening 48. The polygonal end portion 60 of the shaft is received in opening 52 and peened over thereby rendering the shaft 58 movable with the latch lever 50. Other suitable means may be employed to retain the stud. A pair of spaced apart projections 56 on the head 54 of the stud 44 are aligned with recesses 62 on the connecting arm end extension 32 in the open or released position of the latch lever 50; when the latch lever is in the latched position the projections 56 ride out of the recesses 62 compressing the assembly and causing the opposed teeth 36 and 40 to engage against the bias of flat spring 46. A lug 64 struck up from flat spring 46 engages with an aperture 66 in the latch lever 50 to render the flat spring 46 movable with the latch plate or lever 50. Secured to one end of the latch lever 50 is latch element comprising a reversely bent bifurcated spring latch 68 which overlies the bearing 38 on the arm end extension 32 when the latch assembly is in a latched condition. The bifurcations engage a circumferential recess 69 adjacent the end of a stud 70. Stud 70 is secured to the motor crank arm 24 and in assembled condition is journaled in bearing assembly 38. The latch lever 50, the shaft 58 of stud 44 and the flat spring 46 may be rotated on an axis extending through the openings 42, 48 and slot 37; they are operatively secured together for conjoint rotation.

When the latch 50 is rotated so that its longitudinal axis is in alignment with the longitudinal axis of the connecting arm 30 and connecting arm extension 32, the flat spring 46 is under compression. The projections 56 ride out of the recesses 62 to effect a compressive force, acting on the connecting arm 30 and arm end extension 32, thereby causing the teeth 36 and 40 to mesh in locking engagement. The bifurcated latch spring 68 engages the circumferential groove 69 in the stud 70 thereby simultaneously rigidly securing the arm end extension 32 to the connecting arm 30 and also locking the connecting arm assembly in position. Rotation of the latch lever 50 to a position where its longitudinal axis lies transversally to the longitudinal axis of the connecting arm 30 causes the projections 56 to drop into the recesses 62 thereby relieving the compressive force between the connecting arm 30 and the connecting arm end extension 32. This effects a disengagement of the opposing teeth 36 and 40 permitting longitudinal movement of the connecting arm 30 relative to the arm extension 32. This is possible because the elongated slot 37 is longitudinally movable on the stud 44. To prevent rotational movement of the arm end extension 32 relative to the connecting arm 30, the connecting arm 30 is flanged on each side as at 74. The inner end of the arm extension 32 remote from a bearing 38 is bent up as at 76 to lie between the flanges 74.

OPERATION

Figure 2:
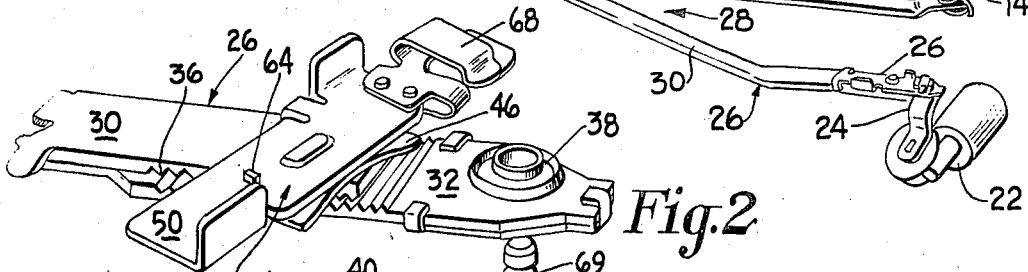
FIG. 2 is a perspective view of the connecting arm assembly of this invention with the latch in open or released position.
Figure 3:
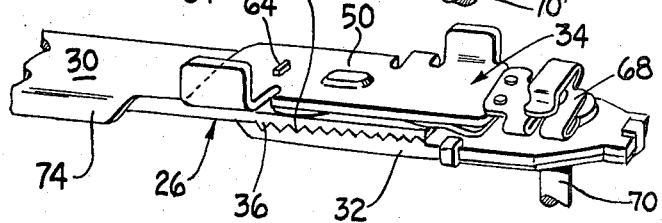
FIG. 3 is a view similar to FIG. 2 illustrating the latch in closed or latched position.
Figure 4:
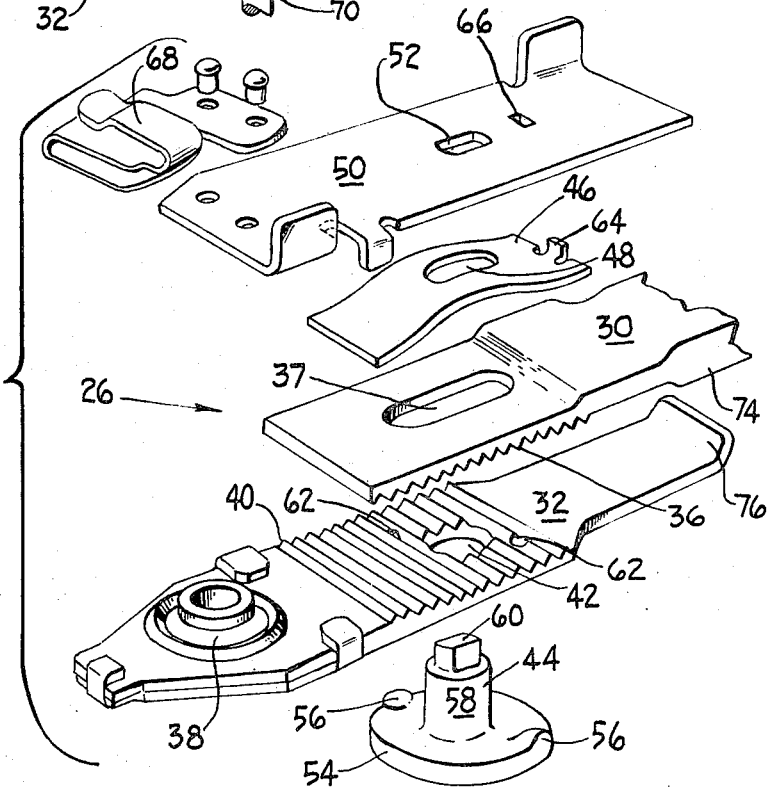
FIG. 4 is an exploded perspective view of a modification of the connecting arm assembly.

The operation of the invention should now be apparent. With the motor assembly 22, the linkage transmission 28 and the wiper arms 16 having wiper blades 16' secured thereto all mounted on the vehicle, latch 50 is placed in the released position with its longitudinal axis lying transversely to the longitudinal axis of the connecting arm 30 as seen in FIG. 2. With the motor assembly 22 and its crank arm 24 set in parked position, the wiper arms are mounted on their respective pivot shafts as close to a parked position as is possible as shown in the solid line position of FIG. 1. The arms may then be manually moved to the ideal parked position against the lower molding of the windshield as shown in the dotted line position of FIG. 1. In the example illustrated the connecting arm assembly 26 is subjected to a compressive force along the longitudinal axis causing the arm end extension to move from the position shown in FIG. 2 to the position shown in FIG. 3. It will of course be understood that in certain arrangements a tension force may be applied causing the connecting arm to expand longitudinally. When the arms 16 are set in the desired parked position the latch is moved to its locked position shown in FIG. 3, thereby applying a compressive force on connecting arm 30 and the arm end extension 32 causing the teeth 36 and 40 to mesh and lock. Thus the connecting arm assembly 26 is securely retained at the length necessary to maintain the wiper arms 16 against the lower molding of the windshield when the wiper is in parked position. Concurrently the bifurcations of spring latch 68 engage groove 69 of stud 70 to secure the connecting arm assembly 26 to the crank arm 24 for pivotal movement about the axis of stud 70.

Figure 5:
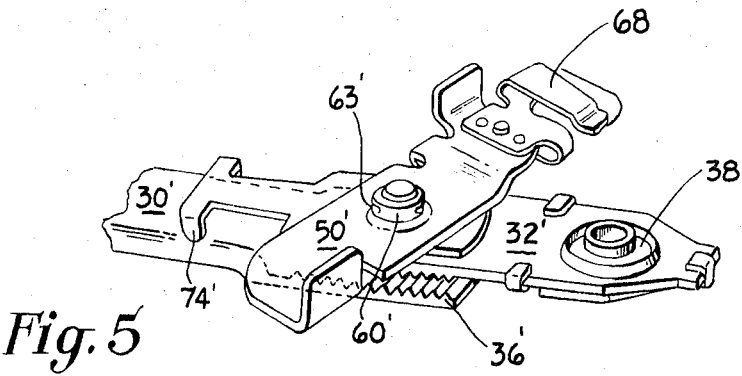
FIG. 5 is a fragmentary perspective view similar to FIG. 2 illustrating a preferred embodiment of the invention.
Figure 6:
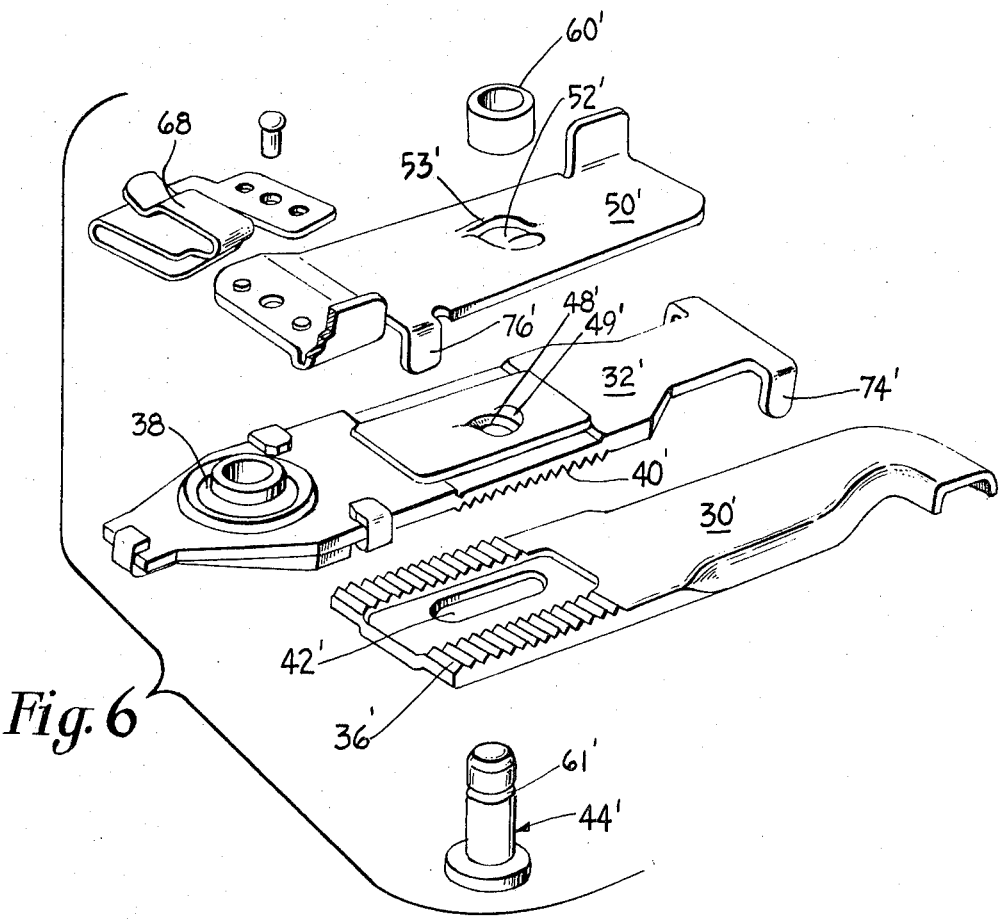
FIG. 6 is an exploded perspective view similar to FIG. 4 of the embodiment of the invention shown in FIG. 4.

Another preferred embodiment of the invention is illustrated in FIGS. 5 and 6. In this embodiment connecting arm end extension 32' overlies connecting arm 30'. Connecting arm 30' is serrated with coined teeth 36' on one surface and connecting arm extension 32' is serrated with coined teeth 40' on its surface in opposition to the teeth 36'. The connecting arm is slotted at 42', the slot 42' having its longitudinal axis coincident with the longitudinal axis of the connecting arm 30'. The free or outer end of the arm end extension 32' includes a compression mounted bearing assembly 38 which may be identical to the bearing assembly 38 on the arm extension 32 as shown in the FIG. 2 embodiment. Overlying the arm extension 32' is a latching plate 50' having a bifurcated spring latch 68 identical with the spring latch 68 in the FIG. 2 embodiment. Openings 48' and 52' are provided in the arm extension 32' and the latch plate 50' respectively. The opening 48' and 52' are in alignment with the slot 42' in the connecting arm 30'. Circumscribing the openings 48' and 52' and opposite to each other are cooperating cam surfaces 49' and 53', respectively, on opposed faces which engage each other. A headed stud 44' is received through the aligned openings 52', and 48' and slot 42'. The latch plate 50' is rotatable on an axis through the slot 42' and aligned openings 48' and 52'. A retaining and spacing ring 60' may be provided to take up the manufacturing tolerances between parts and to retain the latching plate 50' and arm extension 32' on the connecting arm 30'. The parts may be assembled in overlying relationship as described. The ring 60' may be disposed on the exposed free end of the stud 44' which may have a circumferential groove 61' formed therein. The ring 60' may be crimped as at 63' to engage the groove 61' for retaining the parts in assembled condition.

A pair of down-turned ears 74' is provided on the arm end extension 32' which receive the connecting arm 30' in nestled relationship thereby preventing rotational movement between the connecting arm 30' and arm end extension 32'. A lug 76' is provided on the latch plate 50' to limit rotational movement of the latch plate. The cammed surfaces 49' and 53' circumscribing the openings 48' and 52' are so formed as to apply a compressive force between arm extension 32' and the connecting arm 30' when the longitudinal axis of the latch plate 50' is coincident with the longitudinal axis of the arm end extension 32'. This is the latched condition and causes the teeth 40' and 36' to mesh in locked engagement. When the latch plate 50' is rotated to the position shown in FIG. 5 with its axis transverse to the longitudinal axis of the connecting arm 30' and arm extension 32' the compressive force acting between the connecting arm 30' and the arm extension 32' is relieved by the cooperating cam surfaces 49' and 53' or ramps circumscribing the openings 52' and 48'. This permits longitudinal movement of arm end extension 32' relative to the connecting arm 30' until the latch is again rotated to the locked condition.

The operation and function of the FIG. 5 embodiment is similar to the operation and function of the embodiment shown in FIG. 2. The transmission and motor are installed in the vehicle; the motor is set in parked position; the arms are mounted on their respective pivot shafts in the solid line position of FIG. 1 as close as possible to the final park position; the latch plate 50' is set in its unlocked position permitting longitudinal movement of the arm extension 32' relative to the connecting arm 30'. Then the wiper arms 16 are manually moved to the dotted line position against the lower molding of the windshield. This movement is permitted due to the freedom of the connecting arm assembly 26' to extend or collapse longitudinally as the case may require. When the wiper arms are properly positioned the latch plate 50' is rotated to locked condition. The spring latch 68 engages groove 69 in stud 70.

An adjustable crank arm assembly for a windshield wiper linkage transmision has been provided which permits accurate positioning of the wiper arms during installation and which positively maintains the arms in such adjusted position. The movable crank arm of the invention simplifies installation obviating the need for auxiliary tools for adjustment and also serves to retain the connecting arm and the adjacent motor crank arm 24 in assembled operative position with the connecting stud 70 journaled in the bearing assembly 38 for pivotal movement.

Although certain specific embodiments of this invention have been shown and described for the purpose of illustration, it will be apparent that in accordance with its broadest aspects various modifications and other embodiments are possible within the scope of the invention. It is to be understood therefore that the invention is not limited to the specific arrangement shown but in its broadest aspects it includes all equivalent embodiments and modifications which come within the scope of the invention.

What is claimed is:

1. In a linkage transmission assembly for a motor vehicle windshield wiper system; an adjustable connecting arm assembly comprising a connecting arm, a connecting arm end extension secured to said connecting arm in overlapping relationship adjacent an end thereof for longitudinal sliding movement relative to said connecting arm, cooperating engaging means on opposed faces of said arm end extension and said connecting arm in the overlapping area for preventing relative longitudinal movement, a releasable latch lever assembly operatively secured at said overlapping area having camming means acting on said connecting arm assembly to apply a compressive force between said arm end extension and said connecting arm when said latching lever assembly is moved to a first position to thereby cause engagement of said cooperating engaging means and to effect release of said compressive force to permit disengagement of said cooperating engaging means when said latch lever assembly is moved to a second position whereby said arm extension and said connecting arm can move longitudinally relative to each other.

2. An adjustable connecting arm assembly according to claim 1 wherein said latching lever assembly includes a latch lever having a bifurcated spring latch at an end thereof for engagement with a stud on an adjacent linkage element when in latched position.

3. An adjustable connecting arm assembly according to claim 1 wherein said latching lever assembly comprises a latch lever disposed in a plane parallel to said connecting arm assembly and a headed stud secured thereto intermediate the ends of said lever, the longitudinal axis of said headed stud forming the axis of rotation for said lever, said arm end extension and the end of said connecting arm lying intermediate the head of said stud and said lever.

4. An adjustable connecting arm assembly according to claim 3 wherein said latch lever assembly is attached to said stud for rotation therewith.

5. An adjustable connecting arm assembly according to claim 4 wherein said camming means comprises projections on the head of said stud extending toward a surface of said connecting arm end extension, said connecting arm end extension having recesses on said surface receiving said projections when said lever is in unlatched position to thereby relieve the compressive force acting between said connecting arm and said arm end extension.

6. An adjustable connecting arm assembly according to claim 3 wherein said camming means comprises a cam surface on said latch lever disposed adjacent a cooperating cam surface on said arm end extension whereby said cam surfaces engage to apply a compressive force between said arm end extension and said connecting arm when said latch lever is in latching position and said cam surfaces disengage to relieve the compressive force when said latch lever is in unlatched position.

7. An adjustable connecting arm assembly according to claim 6 wherein said arm end extension includes a journal bearing adjacent its free end for receiving a stud of an adjacent linkage element and wherein said latch lever includes a latch element for engaging the stud of the adjacent element to latch it in assembled position when said latch lever is in latched position.

* * * * *